United States Patent [19]

Bahn

[11] Patent Number: 5,274,310
[45] Date of Patent: Dec. 28, 1993

[54] HIGH-SPEED DC MOTOR WITH ADDED CHARGE VOLTAGE

[75] Inventor: Itsuki Bahn, Shibuya, Japan

[73] Assignee: Kabushikigaisha Sekogiken, Tokyo, Japan

[21] Appl. No.: 924,000

[22] PCT Filed: Jan. 23, 1992

[86] PCT No.: PCT/JP92/00057
§ 371 Date: Sep. 16, 1992
§ 102(e) Date: Sep. 16, 1992

[87] PCT Pub. No.: WO92/13386
PCT Pub. Date: Jun. 8, 1992

[30] Foreign Application Priority Data

Jan. 24, 1991 [JP] Japan .................. 3-84842

[51] Int. Cl.$^5$ .................................. H02P 7/00
[52] U.S. Cl. ...................... 318/254; 318/439
[58] Field of Search ............ 318/138, 254, 439; 363/101

[56] References Cited

U.S. PATENT DOCUMENTS

| | | | |
|---|---|---|---|
| 3,824,446 | 7/1974 | Forster et al. | 318/138 |
| 4,494,058 | 1/1985 | Berti | 318/254 X |
| 4,503,369 | 3/1985 | Nishijima et al. | 318/254 |
| 4,563,619 | 1/1986 | Davis et al. | 318/138 |
| 4,633,154 | 12/1986 | Maeda | 318/439 X |
| 4,645,991 | 2/1987 | Ban et al. | 318/439 X |

FOREIGN PATENT DOCUMENTS 2-246791 10/1990 Japan .

Primary Examiner—Jonathan Wysocki
Attorney, Agent, or Firm—Staas & Halsey

[57] ABSTRACT

The present invention relates to a three-phase Y-connection brushless DC motor capable of not only rotating at a high speed with good efficiency but also capable of holding its armature current at a predetermined value. Three sets of transistor bridge circuits ($10a \sim 10d$, $11a \sim 11d$, $11e \sim 11h$) of the motor are separated into six sets of electric circuits. Six pieces of back-flow preventing diodes ($17a \sim 17f$) and capacitors ($16a \sim 16f$), which are in parallel with the back-flow preventing diodes, are connected to output terminals ($2a$, $2b$) of a DC electric power source, which supplies currents to the respective electric circuits. At a terminal end of a position detecting signal, a magnetic energy stored in the armature coil ($4a \sim 4c$) is converted into an electrostatic energy to charge the capacitor to a high voltage and change its armature current steeply. By virtue of this high voltage, an armature current of a next activated armature coil can be built up sharply. With such a measure, the motor can be rotated at a high speed. Furthermore, there are provided two sets of chopper circuits ($14a$, $14b$), which hold the armature current at a predetermined value regulated by a standard voltage.

2 Claims, 5 Drawing Sheets

HIGH-SPEED DC MOTOR WITH ADDED CHARGE VOLTAGE

TECHNICAL FIELD

The present invention relates to a DC motor which is used as a driving source applied to various industrial machines such as a drill machine, a polishing machine and the like in view of its high-speed rotation, and is also used as a driving source, for other applications such as those for electric vehicles in view of its small-sized construction for its large output.

BACKGROUND ART

Conventionally used as a high-speed motor is, for example, an inverter-controlled inductance motor or a semiconductor motor (a brushless motor) including a small-inductance coreless motor. However, this kind of motor is generally equipped with a DC electric power source device for rectifying an output from an AC electric power source, so that the motor tends to become bulky and costly. Especially, where an inverter is built in a motor, such a disadvantage becomes more conspicuous.

Furthermore, the above-described conventional motor normally has a maximum speed of 6,000~10,000 rpm, but this maximum speed has to be decreased in order to obtain a large output. However, if a voltage applied to the motor is increased in order to increase its rotational speed, the efficiency of the motor will fall, and thus its practical merit will be lost.

Besides, at present, an electric circuit for constant-torque drive or constant-speed drive or servo control of the motor, which is capable of operating stably at a high-speed driving condition, is not available. Especially, one capable of operating with a high efficiency is not available.

DISCLOSURE OF INVENTION

The purpose of the present invention is to provide a small-sized and inexpensive DC motor capable of rotating at a high speed and with high efficiency.

An another purpose of the present invention is to provide a DC motor capable of variably controlling its output torque.

In order to accomplish above-described purposes, a first aspect of the present invention provides a high-speed three-phase DC motor in a three-phase Y-connection DC motor comprising: a position detecting device, which detects a position of a magnet rotor by means of position detecting elements disposed with a mutual phase difference of a 120-degree electric angle to produce a first-phase, a second-phase and a third-phase position detecting signals having a width of a 120-degree electric angle not overlapped with each other in an elapsed time, and cyclically disposed to be successively continuous, as well as to produce a fourth-phase, a fifth-phase and a sixth-phase position detecting signals having the same constitution as the first-phase, the second-phase and the third-phase position detecting signals but being offset by a 60-degree phase difference from these position detecting signals respectively;

a first, a second and a third transistor bridge circuits, which are respectively connected to a first-phase, a second-phase and a third-phase armature coils to supply electric currents in both a forward and a backward direction; an electric circuit, which, when said first, second and third transistor bridge circuits are activated in response to said first-phase, second-phase and third-phase position detecting signals respectively, supplies an electric current of a forward direction to the armature coil connected to said activated transistor bridge circuit and, when said first, second and third transistor bridge circuits are activated in response to said fourth-phase, fifth-phase and sixth-phase position detecting signals respectively, supplies an electric current of a backward direction to the armature coil connected to said activated transistor bridge circuit; a first, a second, a third, a fourth, a fifth and a sixth back-flow preventing diodes connected in series to each of six transistors provided in said transistor bridge circuits which are connected to either a positive terminal or a negative terminal of a DC electric power source supplying electric currents to said first, second and third transistor bridge circuits; a first, a second, a third, a fifth and a sixth capacitors connected in parallel with said first, second, third, fourth, fifth and sixth back-flow preventing diodes; an electric circuit which converts a magnetic energy stored in the armature coil into an electrostatic energy of the capacitor provided in parallel with its corresponding back-flow preventing diode when said armature coil is deactivated at a termination of the corresponding position detecting signal to cause a discharge current derived from the magnetic energy to decreases steeply, as well as to makes a current build up sharply by a voltage thus charged in the capacitor when said armature coil is next supplied with a current of the same direction.

Another aspect of the present invention provides a high-speed three-phase DC motor further comprising a first chopper circuit for holding an armature current at a predetermined value in a first-phase, a second-phase and a third-phase current supply modes of the first-phase, second-phase and third-phase armature coils included in said first, second and third transistor bridge circuits, and a second chopper circuit for holding an armature current at a predetermined value in a fourth-phase, a fifth-phase and a sixth-phase current supply modes of the first-phase, second-phase and third-phase armature coils.

As is described above, according to the present invention, when one armature coil is deactivated, a magnetic energy stored in the armature coil is converted into an electro-static energy of the capacitor installed in parallel with its corresponding back-flow prevention diode, whereby the discharge current derived from said magnetic energy is decreased steeply.

Thus, charged voltage is added to the DC electric power source voltage to provide a high voltage when the same armature coil is next activated, so that a current builds up sharply. Therefore, a generation of a counter torque due to the stored magnetic energy and a torque reduction (a generation of torque reduction) due to a slow building-up of armature current can be prevented. Accordingly, not only a rotational speed of the motor can be increased but its efficiency can be improved.

Furthermore, since the armature current is controlled to be held at the constant value by use of the first and the second chopper circuits, it becomes possible to independently control the motor rotational speed and the output torque which are determined in accordance with a voltage applied from the DC electric power source to the current supply control circuit.

Consequently, in the case where the motor to be used is a type of motor designed for rectifying an AC current, a smoothing capacitor incorporated into the DC electric power source is allowed to have a smaller capacitance, thereby enabling further reduction of size as well as a cost reduction.

BEST MODE FOR CARRYING OUT THE INVENTION

A three-phase Y-connection semiconductor motor in accordance with a first embodiment of the present invention is explained with reference to FIGS. 1 to 3, 5 and 6. In the following description, all the angles are expressed in terms of electric angle.

Figure 1:
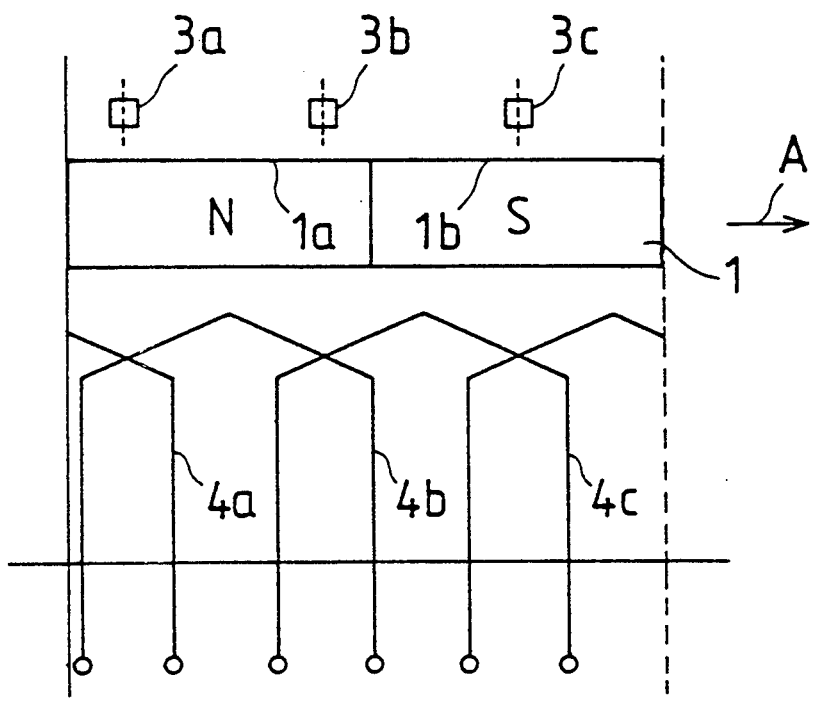
FIG. 1 is a development showing a magnet rotor and armature coils of a DC motor in accordance with a first embodiment of the present invention.
Figure 2:
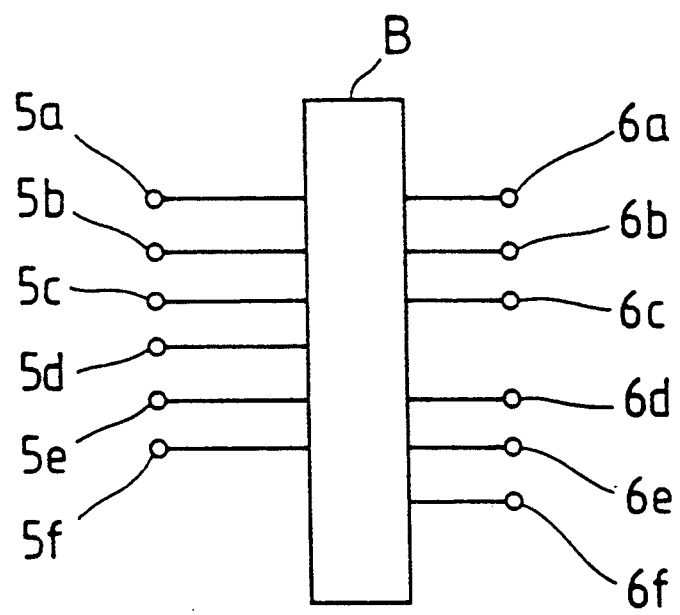
FIG. 2 is a block diagram showing a logic circuit constituting a position detecting device in cooperation with position detecting elements shown in FIG. 1.

The semiconductor motor includes a motor main body having a magnet rotor and 1 and a first-phase, a second-phase, and a third-phase armature coils 4a, 4b, and 4c and a position detecting device for detecting a rotational position of the rotor 1, as shown in FIG. 1. The position detecting device comprises three hole elements (i.e. position detecting elements) 3a, 3b and 3c disclosed in FIG. 1 and a logic circuit B shown in FIG. 2.

The Hall elements 3a, 3b and 3c are spaced with a mutual phase difference of 120 degrees, and are fixed on the side of armature of the motor main body, facing magnetic poles 1a and 1b of the rotor 1. The logic circuit B generates six series of position detecting signals for actuating the motor in response to electric output signals from Hall elements 3a, 3b and 3c, and is constituted in the same manner as a conventional one.

That is, electric signals sent out from Hall elements 3a~3c and their inverted electric signals are applied to input terminals 5a~5f of the logic circuit B through conventional amplification means (not shown). The logic circuit B sends out position detecting signals from output terminals 6a~6f according to these electric signals. And, the Hall elements 3a, 3b and 3c are fixed at predetermined positions where position detecting signals are to be generated for supplying currents to respective phase armature coils 4a, 4b and 4c within the maximum torque generating section of the motor.

Figure 3:
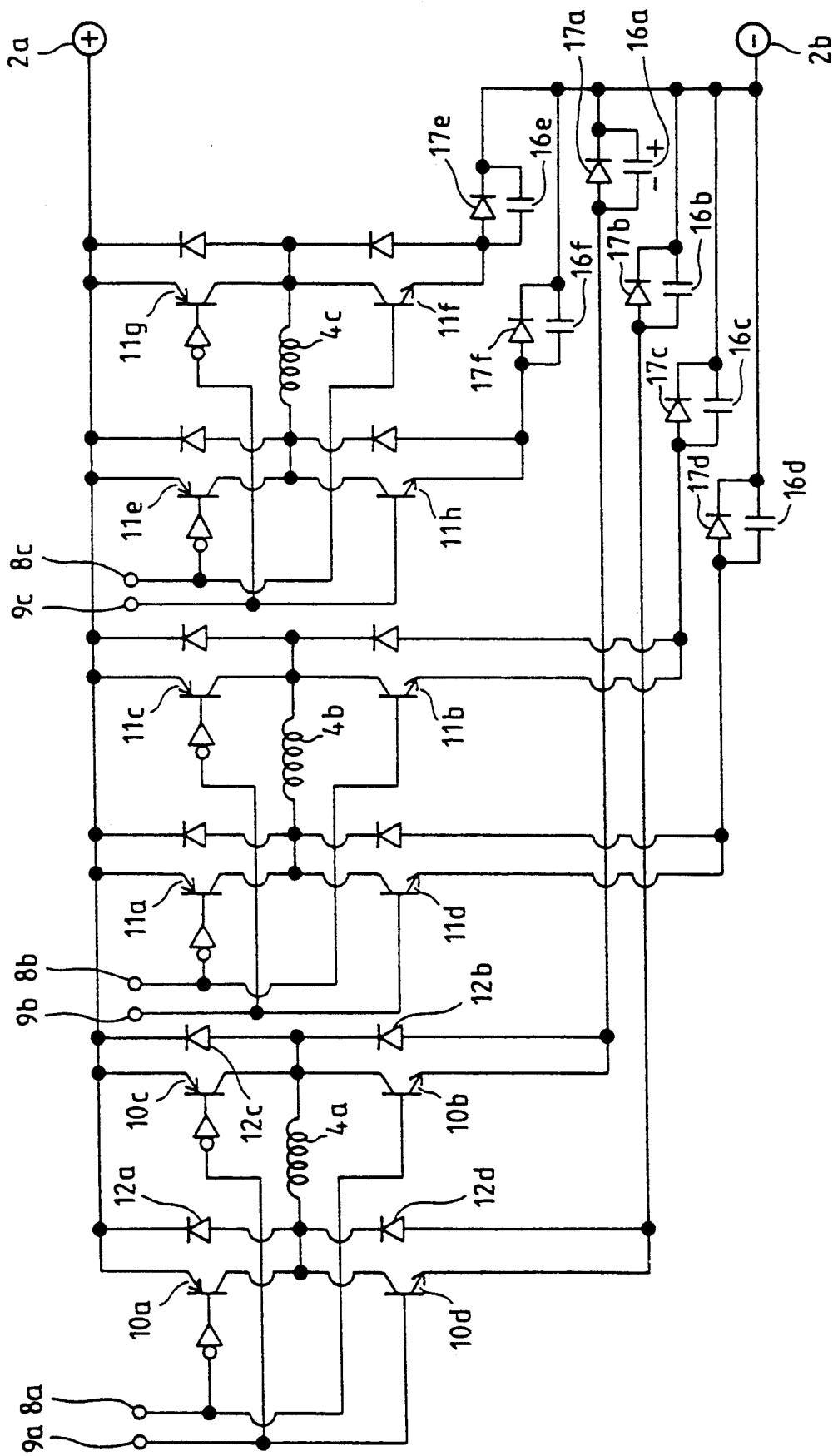
FIG. 3 is a circuit diagram showing a current supply control circuit used together with the position detecting device of FIGS. 1 and 2.

The DC motor further includes a current supply control circuit for controlling currents supplied to the first-phase, the second-phase, and the third-phase armature coils 4a, 4b, and 4c and a DC electric power source supplying a DC electric power to this current supply control circuit, as shown in FIG. 3. The current supply control circuit includes a plurality of input terminals 8a~8c and 9a~9c which are connected to the output terminals 6a~6f of the logic circuit B respectively.

Explained hereinafter is a circuit composition relating to the first-phase armature coil 4a of the current supply control circuit shown in FIG. 3.

One end of the armature coil 4a is connected to a collector of a transistor 10a; an emitter of the transistor 10a is connected to a positive terminal 2a of the DC electric power source; and a base of the transistor 10a is connected to the input terminal 8a of the current supply control circuit through an inversion circuit.

On the other hand, this input terminal 8a is further connected to a base of a transistor 10b, and an emitter of the transistor 10b is connected to a negative terminal 2b of the DC electric power source through a diode 17a. This diode 17a is connected in parallel with a capacitor 16a.

A collector and a base of a transistor 10d are connected to a junction between the armature coil 4a and the transistor 10a, and the input terminal 9a of the current supply control circuit respectively. An emitter of this transistor 10d is connected to the negative terminal 2b of the DC electric power source through a diode 17b. This diode 17b is connected in parallel with a capacitor 16b.

Still further, a collector of the transistor 10b is connected to a junction between the armature coil 4a and a transistor 10c; an emitter of the transistor 10c is connected to the positive terminal 2a of the DC electric power source; and a base of the transistor 10c is connected to the input terminal 9a of the current supply control circuit through an inversion circuit.

A junction between the armature coil 4a and the transistors 10a and 10d is connected to an anode of a diode 12a and also to a cathode of a diode 12d; a cathode of the diode 12a is connected to the positive terminal 2a of the DC electric power source; and an anode of diode 12d is connected to the negative terminal 2b of the DC power source through the diode 17b (and its associated capacitor 16b connected in parallel with this diode). A cathode of diode 12b, whose anode is connected to a negative terminal 2b of the DC power source through diode 17a (and capacitor 16a connected in parallel with this diode), is connected to a junction common to the armature coil 4a, transistors 10b, 10c and the diode 12c. A cathode of the diode 12c is connected to the positive terminal 2a of the DC electric power source.

Descriptions of compositions of current supply control circuit relating to the second-phase and the third-phase armature coils 4b and 4c are omitted here, since they are the same as that of the circuit relating to the armature coil 4a.

The armature coil 4a and the transistors 10a~10d constitute a bridge circuit. In the same manner, a combination of the armature coil 4d and the transistors 11a~11d and a combination of the armature coil 4c and the transistors 11e~11h constitute bridge circuits respectively.

Here, an operation of the above-described DC motor will be explained with reference to FIGS. 3, 5 and 6.

When the rotor 1 rotates, respective Hall elements 3a, 3b and 3c send out rectangular-waveform electric signals 25, 27 and 29 (FIG. 6) to the input terminals 5a, 5c and 5e of logic circuit B respectively. These electric signals become H(high)-level signals as are represented by reference numerals 25a, 25b, 27a, 27b, 29a and 29b in FIG. 6, when the Hall elements 3a, 3b and 3c are in a magnetic field of a magnetic pole (S-pole) 1b.

Furthermore, other electric signals 26, 28 and 30, which are obtained by inverting above electric signals 25, 27 and 29 by means of elements (not shown), are supplied to input terminals 5b, 5d and 5f of the logic circuit B respectively. Each of above-described H-level electric signals 25a~30b has a 180-degree width and is offset from its adjacent one by a mutual phase difference of 180 degrees (for example, the signal 25a and its adjacent signal 25b).

The logic circuit B receives the first to the sixth position detecting signals 31 to 36 (FIG. 6) obtained from above-described electric signals 25~30, and sends out these signals from its output terminals 6a~6f to the input terminals 8a~8c, and 9a~9c of the current supply control circuit of FIG. 3.

In the following description, a position detecting signal 31 is referred to as a first-phase position detecting signal, and position detecting signals 32, 33, 34, 35 and 36 are referred to as second-phase, third-phase, fourth-phase, fifth-phase and sixth-phase position detecting signals.

Figure 5:
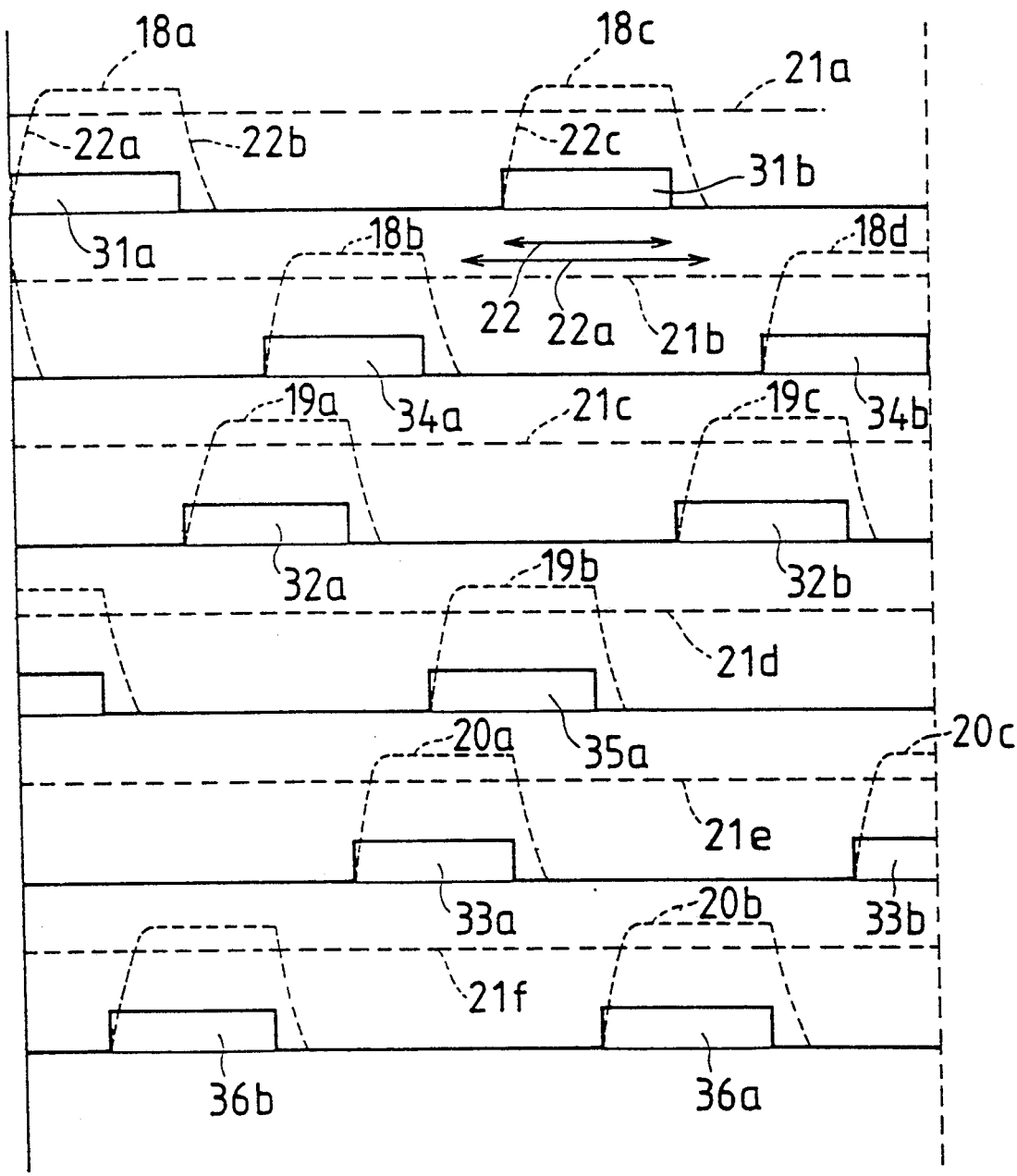
FIG. 5 is a timing chart showing position detecting signals sent out from the logic circuit of FIG. 2 and armature currents; and, FIG. 6 is a timing chart showing electric signals sent out from the position detecting elements of FIG. 1 and the position detecting signals sent out from the logic circuit of FIG. 2.
Figure 6:
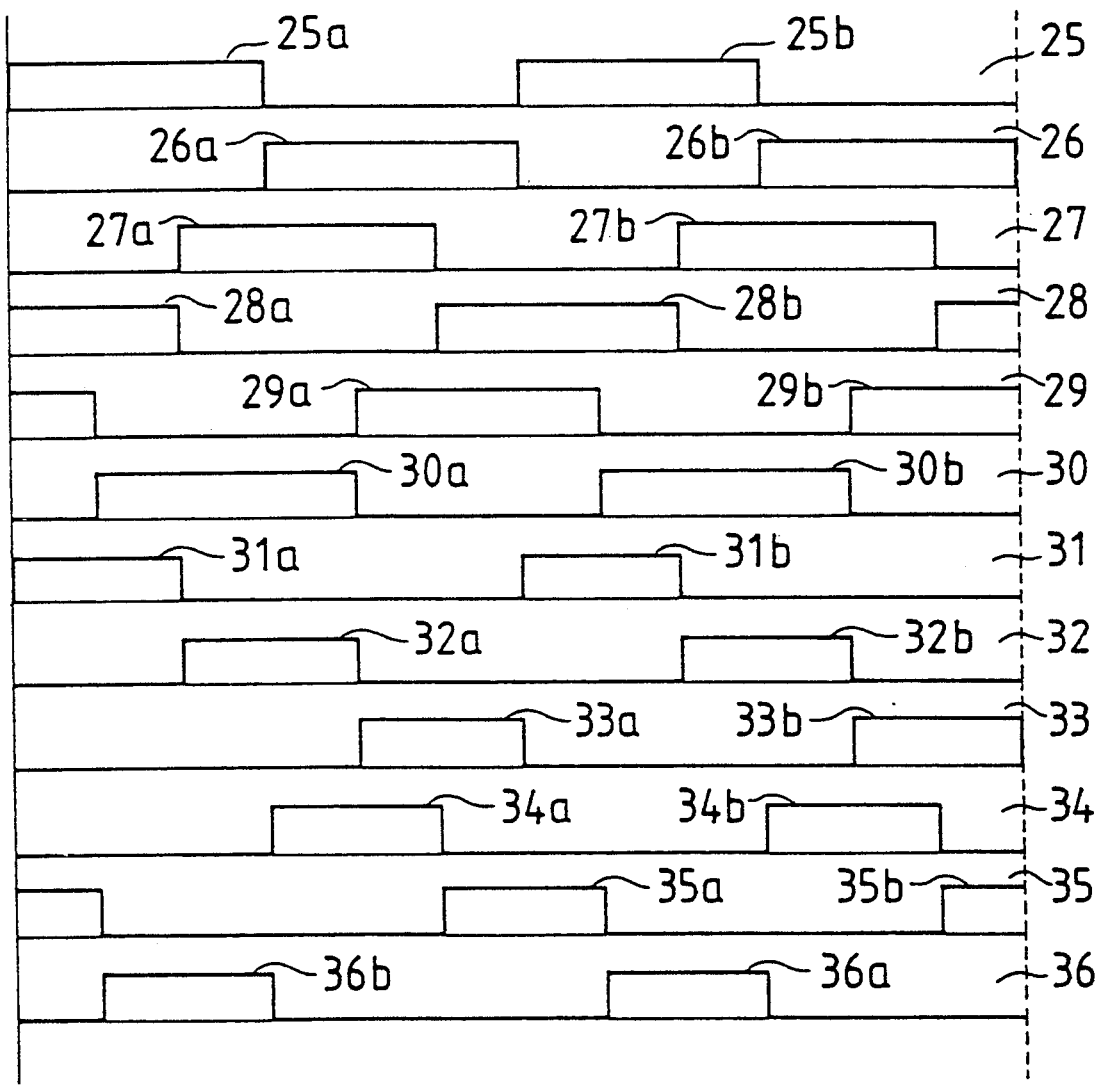

FIG. 5 shows a relationship between these first-phase to sixth-phase position detecting signals 31~36 and armature currents. In FIG. 5, from top to bottom, there are shown the first-phase, the fourth-phase, the second-phase, the fifth-phase, the third-phase and the sixth-phase position detecting signals and their related armature current waveforms.

Here, if an H-level input signal is applied to the input terminal 8a of the current supply control circuit, both the transistors 10a and 10b are turned on. Consequently, both ends of the armature coil 4a are connected to the positive terminal 2a and the negative terminal 2b of the DC electric power source respectively, so that the armature coil 4a is activated with a current of a forward direction (i.e. a right direction in FIG. 3). On the other hand, if an H-level input signal is applied to the input terminal 9a, both the transistors 10c and 10d are turned on to cause the armature coil 4a to be activated with a current of a backward direction (i.e. a left direction in FIG. 3).

For the same reason, when H-level input signals are supplied to the input terminals 8b and 9b, the armature coil 4b will be activated with a current of a forward or a backward direction. The same explanation as the above-described explanation is applicable to the armature coil 4c.

As can be understood from the above-described explanation, the armature coils 4a, 4b and 4c are successively supplied with currents of forward direction during time periods equal to widths of H-level position detecting signals 31a, 31b, - - -, 32a, 32b, - - -, and 33a, 33b, - - -. Whereas, the armature coils 4a, 4b and 4c are successively supplied with currents of backward direction during time periods equal to widths of H-level position detecting signals 34a, 34b, - - -, 35a, 35b, - - -, and 36a, 36b, - - -.

When the H-level position detecting signal 31a is supplied to the input terminal 8a of the current supply control circuit as previously described, the positive terminal of the DC electric power source of FIG. 3 applies a positive voltage to turn on transistors 10a and 10b, thereby supplying the armature coil 4a an armature current of the right direction (i.e. the forward direction) in FIG. 3. In an initial stage of current supply controlling, the armature current increases, as shown by a dotted line 22a in FIG. 5, due to the inductance of the armature coil 4a. At a terminal end of the H-level position detecting signal 31a, the transistors 10a and 10b are turned off. Therefore, a magnetic energy stored in the armature coil 4a is discharged through the diodes 12c and 12d, and the DC electric power source terminals 2a and 2b, to charge the capacitor 16a. The capacitor 16a is charged to have a plus and a minus polarities as indicated in FIG. 3, and a voltage resulting from adding this charged voltage to the DC electric power source voltage between the positive and negative terminals 2a and 2b is applied to the armature coil 4a. Accordingly, the magnetic energy stored in the armature coil 4a is promptly transformed into an electrostatic energy of the capacitor 16a, and partly returned to the DC electric power source. Thus, the armature current of the armature coil 4a decreases steeply. This trailing-edge portion is shown by a reference numeral 22b in FIG. 5.

If a width of the trailing-edge portion 22b exceeds 30 degrees, a current supply period of the armature current becomes larger than 180 degrees (a width of a positive torque generating section) to cause a counter torque to be generated.

Next, after a predetermined time has elapsed, the H-level position detecting signal 31b is supplied to the same input terminal 8a, whereby the transistors 10a and 10b are turned on to activate the armature coil 4a by supplying the current of the same direction to the armature.

As previously described, a voltage applied to this armature coil 4a in this case is equal to the summation of the charged voltage of the capacitor 16a and the DC electric power source voltage between the terminals 2a, 2b, so that a building-up portion 22c of the armature current curve 18c will become sharp. Furthermore, a trailing-edge portion becomes also sharp due to a current discharge to the capacitor 16a through diodes 12c, 12d. The above-described conditions are completely the same as those in the case of a building-up portion 22a of the curve 18a, and thus the building-up portion 22a also becomes sharp.

The input terminal 9a of the current supply control circuit is supplied with electric signals, that is position detection signal 34, - - -. When the H-level electric signal 34a is inputted, the transistors 10c and 10d are turned on to supply the armature coil 4a an armature current of the left direction in FIG. 3. The building-up of the armature current becomes sharp by virtue of the summation voltage of the charged voltage of the capacitor 16b and the DC electric power source voltage between the positive terminal and the negative terminal.

At a terminal end of the H-level position detecting signal 34a, the transistors 10c and 10d are turned off. Therefore, a magnetic energy stored in the armature coil 4a is prevented from returning to the DC electric power source due to presence of the diode 17b and is converted into an electrostatic energy of the capacitor 16b. Since the capacitor 16b is charged up to a high voltage, a current derived from the magnetic energy decreases steeply.

Next, when an electric signal of the H-level position detecting signal 34b is supplied to the input terminal 9a, the current supply control to the armature coil 4a is carried out in the same manner. The supplied currents are shown by dotted lines 18b and 18d in FIG. 5.

As the rotational speed of the motor becomes a high speed, respective time widths of the H-level position detecting signals 31a, 31b, - - - and 34a, 34b, - - -decrease but the widths of above-described building-up portion and the trailing-edge portion will remain unchanged. Accordingly, if the rotational speed exceeds approximately 10 thousands rpm, the widths of the building-up portion and the trailing-edge portion become relatively large, exceeding 30 degrees. This causes the torque reduction (or the increase of torque reduction effect), as well as the increase of the counter torque, thereby further causing the deterioration of efficiency and inability to increase the speed.

However, according to the present invention, the charged voltage can be increased by reducing the capacitances of the capacitors 16a and 16b, and thus the building-up time width of the trailing-edge time width can be reduced, thereby completely eliminating the above-described inconveniences. Thus, the charged voltages of the capacitors 16a and 16b have to be set below the withstand voltages of the transistors 10a, 10b, - - - . An upper limit of the rotational speed is determined depending on the withstand characteristics of the transistors 10a, 10b, - - - .

When the second-phase and the fifth-phase position detecting signals 32 and 35 of FIG. 5 are supplied to the input terminals 8b and 9b of the current supply circuit of FIG. 3 respectively, the on-off operations of transistors 11a, 11b, - - - , 11d are controlled so that the armature coil 4b is not only supplied with a current of right direction in FIG. 3 as is represented by dotted curves 19a and 19c in FIG. 5 but also supplied with a current of left direction as is represented by a dotted curve 19b in FIG. 5.

Respective building-up portions and trailing-edge portions of the dotted curves 19a, 19b and 19c become sharp by virtue of the functions of the back-flow preventing diodes 17c, 17d and the capacitors 16c, 16d in the same manner as the case of the armature coil 4a.

A width of an arrow 22 shown in FIG. 5 is 120 degrees and denotes a current supply section, whereas an arrow 22a has a 180-degree width, which denotes a positive torque generating section. Though the arrow 22 is positioned to be located at an intermediate portion of the arrow 22a by adjusting the fixing positions of the position detecting elements, it is recommendable to shift the arrow 22 toward left according to an increase of the rotational speed so as to obtain a maximum torque.

The input terminals 8c and 9c of the current supply control circuit of FIG. 3 are supplied with the third-phase and the sixth-phase position detecting signals 33 and 36 respectively so as to turn on and off transistors 11e, 11f, - - - . In response to the input to the input terminal 8c, the armature coil 4c is activated to be supplied with an armature current of a right direction in FIG. 3, whereas in response to the input to the input terminal 9c, the armature coil 4c is activated with an armature current of a left direction in FIG. 3.

In FIG. 5, armature currents of a forward or a backward direction are shown by curves 20a, 20c, - - - and curves 20b, - - - . Functions of the diodes 17e, 17f and capacitors 16e, 16f are the same as those in previously described case.

A composite output torque is obtained as a summation of torques generated in response to the dotted curves 18a, 18b, 18c, - - - , 19a, 19b, 19c, - - - , and 20a, 20b, 20c, which is similar to an output torque of a normal three-phase Y-connection DC motor. However, the motor in accordance with the present invention is characteristic of its ability to rotate at an extremely high speed without deteriorating its efficiency, compared with a conventional motor.

By the way, the transistors 10a, 10b, - - - , 11a, 11b, - - - can be replaced by other semiconductor switching elements. For example, a so-called IGBT, a combination of a field effect transistor and a normal transistor, would be appropriate in the case where a large-output motor is used.

Though the capacitors 16a, 16b, - - - 16f are connected in parallel with the diodes 17a, 17b, - - - 17f respectively, the same purpose can be accomplished even if respective capacitors are connected in parallel with the units of respective diodes and the DC electric power source which are connected serially to each other.

As is described above, according to the present embodiment, at the moment when one armature coil having been activated is deactivated, the magnetic energy stored in the armature coil is converted into the electrostatic energy of the capacitor. Thus, the discharge current due to this magnetic energy can be sharply decreased.

After a predetermined time has elapsed, when the above-described armature coil is activated again in the same direction, the summation voltage resulting from adding the high voltage charged in this capacitor to the DC electric power source voltage is applied to the above-described armature coil, thereby enabling the armature current to build up sharply.

Accordingly, by selectively adjusting the capacitance of the capacitor, the occurrence of torque reduction and counter torque can be suppressed to a considerable extent. Thus, motor capable of operating with a high efficiency even at a high speed of more than 100 thousands rpm can be obtained.

By the way, the same effect can be obtained even if the diodes 17a, 17b, - - - , 17f and the capacitors 16a, 16b, - - - , 16f are disposed on the side of the positive terminal 2a of the DC electric power source.

In a semiconductor motor in accordance with a second embodiment of the present invention, the current supply control circuit is so constituted as to install above-described diodes and capacitors on the side of the positive terminal of the DC electric power source and further as to include chopper circuits for maintaining the armature current at a predetermined value.

Here, a current supply control circuit in accordance with the second embodiment is explained with reference to FIG. 4. The following description is mainly concerned with the portion relating to the first-phase armature coil 4a.

Figure 4:
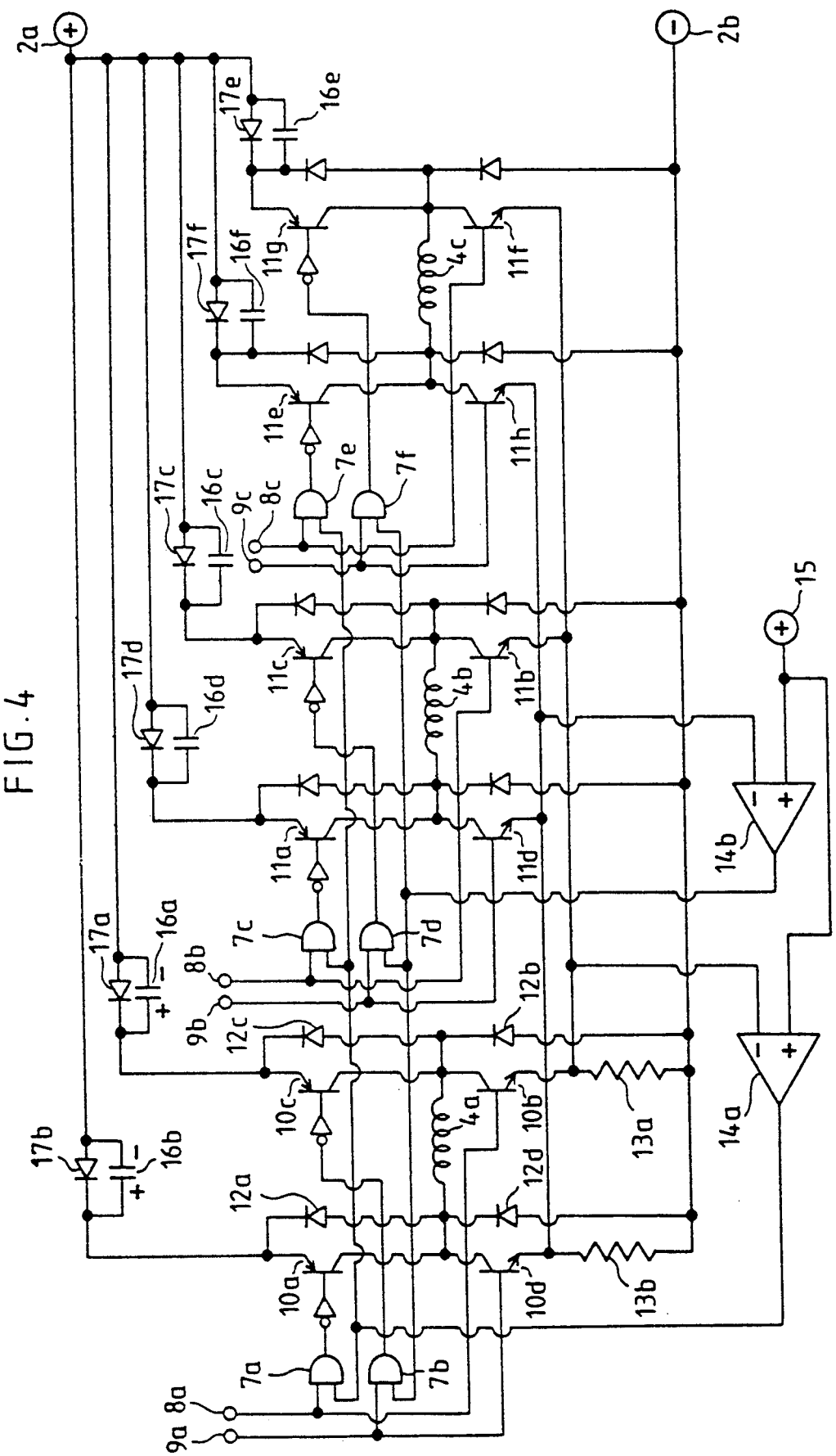
FIG. 4 is a circuit diagram similar to FIG. 3 and showing a current supply control circuit applied to a DC motor in accordance with a second embodiment of the present invention.

The parallel circuits, one consisting of a diode 17a and a capacitor 16a, and the other consisting of a diode 17b and a capacitor 16b, which are further connected respectively between each of emitters of transistors 10b and 10d and the negative terminal 2b of the DC electric power source in the current supply control circuit shown in FIG. 3, are interposed respectively between each of emitters of transistors 10c and 10a and the positive terminal 2a of the DC electric power source in the case of the current supply control circuit shown in FIG. 4.

On the other hand, the inversion circuits connected to the bases of the transistors 10a and 10c are connected to output terminals of AND circuits 7a and 7b. One input terminal of the AND circuit 7a is connected to the input terminal 8a, whereas one input terminal of the AND circuit 7b is connected to the input terminal 9a. And, the other input terminal of the AND circuit 7a is connected to an output terminal of an operational amplifier 14a, whereas the input terminal of the AND circuit 7b is connected to an output terminal of an operational amplifier 14b.

Plus input terminals of the operational amplifiers 14a and 14b are connected to a standard voltage terminal 15, whereas minus input terminals of the operational amplifiers 14a and 14b are connected to the emitters of the transistors 10b and 10d respectively. Furthermore, there are provided resistances 13a and 13b between the each of emitters of the transistors 10b and 10d and the negative terminal of the DC electric power source.

Current supply control circuits relating to the second-phase and third-phase armature coils 4b and 4c have the same constitutions as the first phase armature coil 4a, and thus their explanations are omitted here.

The resistances 13a and 13b are commonly used to the armature coils 4a and 4c. That is, emitters of the transistors 11b and 11f are connected to the junction between the transistor 11b and the resistance 13a, whereas emitters of the transistors 11d and 11h are connected to the junction between the transistor 11d and the resistance 13b.

Next, a function of the current supply control circuit shown in FIG. 4 will be explained hereinafter.

When the downside inputs of the AND circuits 7a, 7b, - - -, 7f of FIG. 4 are respectively H-level, current supplied controls to the armature coils 4a, 4b and 4c and supplied armature currents are the same as the current supply control circuit of FIG. 3. The input terminals 8a and 9a of the current supply control circuit of FIG. 4 are supplied with position detecting signals 31 and 34 shown in FIGS. 5 and 6. The input terminals 8b and 9b are supplied with position detecting signals 32 and 35, whereas input terminals 8c and 9c are supplied with position detecting signals 33 and 36 respectively.

Accordingly, the following description will be made as to the case where the terminal 8a is fed with an H-level input signal.

When an electric signal of the H-level position detecting signal 31a is inputted, a building-up of the armature current becomes sharp as is indicated by a current curve 22a in FIG. 5 by virtue of a high voltage charged in the capacitor 16a with polarities shown in FIG. 4. At the terminal end of the position detecting signal 31a, the magnetic energy stored in the armature coil 4a is discharged and the capacitor 16a is charged up to and held at a high voltage. Accordingly, the armature current decreases steeply as shown by the curve 22b. A dotted curve 18a shows the armature current curve.

With respect to the H-level position detecting signal 31b to be next inputted to the same input terminal 8a, the circumstances are the same, and therefore the building-up and the trailing-edge of the armature current become sharp, as shown by a dotted line 18c in FIG. 5.

In the case where the H-level position detecting signals 34a and 34b are supplied to the input terminal 9a, a current supply control of the armature coil 4a in a backward direction is carried out in the same manner by means of the diodes 17b and the capacitor 16c. Other current supply controls for the armature coils 4b and 4c are carried out in the same manner as the case of FIG. 3 in accordance with the position detecting signals inputted to the terminals 8b, 9b, 8c and 9c.

If to be constituted by conventional measures, a chopper circuit for holding respective armature coils at the first-phase, the second-phase, - - - and the sixth-phase current values is required to comprise six sets of chopper circuits. However, according to the present invention, as shown in FIG. 4, only two sets of chopper circuits are required to hold the armature current at a predetermined value. This characteristic feature of the present invention will be explained in more detail in the following.

In FIG. 4, armature currents flowing through the armature coils 4a, 4b and 4c in the right direction are overlapped with each other at the building-up portions and trailing-edge portions as shown by curves 18a, 19a, 20a, - - - of FIG. 5, but are continuous. Since all the supplied currents pass the resistance 13a, a voltage drop at the resistance 13a is proportional to the supplied current.

Moreover, all the armature currents flowing through the armature coils 4a, 4b and 4c in the left direction pass the resistance 13b. Therefore the supplied currents become as shown by curves 18b, 19b, 20b, - - - of FIG. 5, and are continuous. Accordingly, a voltage drop at the resistance 13b is proportional to the above-described armature current value.

When the voltage drop at the resistance 13a exceeds the input value of the operational amplifier 14a which is equal to the voltage of the standard voltage terminal 15, an output of the operational amplifier 14a becomes an L-level, and output values of the AND circuits 7a, 7c and 7e also become an L-level. Thus, the armature coils 4a, 4b and 4c are deactivated. The magnetic energies stored in respective armature coils charge the capacitors 16a, 16c and 16e, and the discharge currents decrease.

If these current values decrease by a predetermined value, the output value of the operational amplifier 14a will be restored to an H-level, and accordingly currents of respective armature coils increase. Thus, the current supply control circuit of FIG. 4 includes the chopper circuit for repeating such a cycle. As a result, the upper limit of the armature current is restricted by the voltage value of the standard voltage terminal 15.

The chopper function of the second chopper circuit consisting of the operational amplifier 14b, the resistance 13b and the AND circuits 7b, 7d and 7f is the same as the first chopper circuit. Therefore, the corresponding armature current value is restricted by the voltage of the standard voltage terminal 15. Accordingly, the motor can be driven at a predetermined output torque, and also can be controlled at a constant speed.

Dotted lines 21a, 21b, - - -, 21f of FIG. 5 show upper limit values of the armature currents determined by the above-described standard voltage. Respective armature currents are restricted by these upper limit values so as not to exceed these values. Accordingly, since the output torque is not dependent on the applied voltage, even if the DC electric power source includes a ripple component, it affects nothing but the chopper frequency.

Hence, in the case where an AC electric power source is rectified for usage, the capacitance of the smoothing capacitor can be reduced. Especially, in the case where the electric power source is a three-phase AC power source, the capacitance can further be reduced. Thus, this feature of the present invention can contribute to reducing the size of the electric power source.

Further, according to the present invention, a wider range of sine-wave voltage of an AC electric power source can be used without limiting the range of usage to that covering only the peak and its vicinity of the sine-wave voltage, that is, a supplied current corresponding to a half of the sine-wave can be utilized. Thus, not only the electric noises can be reduced but also a power factor can be improved.

In the current supply control circuit of FIG. 4, though the upside transistors ($10a$, $10c$, - - -) in the bridge circuits are on-off controlled for the chopper control, the same purpose can be accomplished even through the on-off control of the downside transistors ($10b$, $10d$, - - -).

In such a case, the chopper control can be made by providing a monostable circuit operable by outputs of the operational amplifiers $14a$ and $14b$ so that the downside transistors in turned-off positions by the output of the monostable circuit.

As described in the foregoing description, the current supply control circuit of FIG. 4 brings the following advantages in addition to the merits of the current supply control circuit of FIG. 3.

That is, the armature current is held at the predetermined value by the chopper circuit. Therefore, even if the DC electric power source includes a large ripple component, the armature current can be held at this predetermined value, though the chopper frequency may change. Accordingly, a constant-torque or a constant-speed control can be realized.

The smoothing capacitor of much smaller capacitance will do for electric power source. Especially, in the case where a three-phase AC electric power source is used, the capacitance of the smoothing capacitor can be reduced further to a smaller value.

Moreover, after the AC electric power source has been rectified, not only the peak value of the sine-wave voltage but a relatively wide range of the sine-wave voltage can be utilized. Therefore, the rectifying device not only can be made more compact and inexpensive but also electric noises can be suppressed to smaller values, thereby contributing to the increase the power factor.

What is claimed is:

1. A high-speed three-phase DC motor in a three-phase Y-connection DC motor comprising:

a position detecting device which detects a position of a magnet rotor by mean of position detecting elements disposed with a mutual phase difference of a 120-degree electric angle to produce a first-phase, a second-phase and a third-phase position detecting signals having a width of a 120-degree electric angle not overlapped with each other in an elapsed time, and cyclically disposed to be successively continuous, as well as to produce a fourth-phase, a fifth-phase and a sixth-phase position detecting signals having the same constitution as the first-phase, the second-phase and the third-phase position detecting signals but being offset by a 60-degree phase difference from these position detecting signals respectively;

a first, a second and a third transistor bridge circuits which are respectively connected to a first-phase, a second-phase and a third-phase armature coils to supply electric currents in both a forward and a backward direction;

an electric circuit which, when said first, second, and third transistor bridge circuits are activated in response to said first-phase, second-phase, and third-phase position detecting signals respectively, supplies an electric current of a forward direction to the armature coil connected to said activated transistor bridge circuit and, when said first, second and third transistor bridge circuits are activated in response to said fourth-phase, fifth-phase and sixth-phase position detecting signals respectively, supplies an electric current of a backward direction to the armature coil connected to said activated transistor bridge circuit;

a first, a second, a third, a fourth, a fifth and a sixth back-flow preventing diodes connected in series to each of six transistors provided in said transistor bridge circuits which are connected to either a positive terminal or a negative terminal of a DC electric power source supplying electric currents to said first, second and third transistor bridge circuits;

a first, a second, a third, a fourth, a fifth and a sixth capacitors connected in parallel with said first, second, third, fourth, fifth and sixth back-flow preventing diodes;

an electric circuit which converts a magnetic energy stored in the armature coil into an electrostatic energy of the capacitor provided in parallel with its corresponding back-flow preventing diode when said armature coil is deactivated at a termination of the corresponding position detecting signal to cause a discharge current derived from the magnetic energy to decrease steeply, as well as makes a current build up sharply by a voltage thus charged in the capacitor when said armature coil is next supplied with a current of the same direction.

2. A high-speed three-phase DC motor in accordance with claim 1, further comprising a first chopper circuit for holding an armature current at a predetermined value in a first-phase, a second-phase and a third-phase current supply modes of the first-phase, second-phase and third-phase armature coils included in said first, second and third transistor bridge circuits, and a second chopper circuit for holding an armature current at a predetermined value in a fourth-phase, a fifth-phase and a sixth-phase current supply modes of the first-phase, second-phase and third-phase armature coils.

* * * * *